United States Patent
Liu et al.

(10) Patent No.: US 10,484,230 B2
(45) Date of Patent: Nov. 19, 2019

(54) MITIGATING OPTICAL MODULATOR IMPAIRMENT FOR COHERENT OPTICAL COMMUNICATION SYSTEMS

(71) Applicant: Google LLC, Mountain View, CA (US)

(72) Inventors: Hong Liu, Palo Alto, CA (US); Xiang Zhou, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/583,862

(22) Filed: May 1, 2017

(65) Prior Publication Data

US 2018/0316541 A1 Nov. 1, 2018

(51) Int. Cl.
*H04L 27/38* (2006.01)
*H04L 5/00* (2006.01)
(Continued)

(52) U.S. Cl.
CPC ..... *H04L 27/3818* (2013.01); *H04B 10/0799* (2013.01); *H04B 10/07953* (2013.01);
(Continued)

(58) Field of Classification Search
CPC ......... H04L 2027/0067; H04L 27/2657; H04L 5/0048; H04L 7/0331; H04L 7/0087;
(Continued)

(56) References Cited

U.S. PATENT DOCUMENTS

| | | | |
|---|---|---|---|
| 2005/0058227 A1* | 3/2005 | Birkett | H04L 27/22 375/329 |
| 2011/0150503 A1* | 6/2011 | Winzer | H04B 10/60 398/202 |

(Continued)

FOREIGN PATENT DOCUMENTS

| | | |
|---|---|---|
| CN | 105573422 A | 5/2016 |
| EP | 1024634 A2 | 8/2000 |
| WO | 2001/08292 A1 | 2/2001 |

OTHER PUBLICATIONS

Anzuola, Esdras, "Atmospheric compensation experiments on free-space optical coherent communication systems," A Thesis Submitted in Partial Fulfillment of Reqirements for the Degree of Doctor of Pilosophy in the Doctorate on Signal Theory and Communications Polytechnical University of Barcelona, Mar. 2015, 230 pages.
(Continued)

*Primary Examiner* — David C Payne
*Assistant Examiner* — Sarah Hassan
(74) *Attorney, Agent, or Firm* — Lerner, David, Littenberg, Krumholz & Mentlik, LLP (57) ABSTRACT

System for adjusting a reference constellation for demodulating an optical signal include a coherent electro-optical receiver configured to convert a received optical signal to a plurality of electrical signals, an array of analog-to-digital convertors configured to digitize the plurality of electrical signals, and processor logic. The processor logic is configured to process the digitized plurality of electrical signals using a reference constellation to yield a plurality of decoded signals and a signal quality measurement. The reference constellation includes an inphase component equal to an ideal inphase component plus an inphase offset and a quadrature component equal to an ideal quadrature component plus a quadrature offset. The processor logic is configured to determine an optimal inphase offset and optimal quadrature offset. The processor logic is configured to update the reference constellation using the optimal inphase offset and the optimal quadrature offset.

21 Claims, 5 Drawing Sheets

(51) Int. Cl.
  *H04B 10/079* (2013.01)
  *H04B 10/61* (2013.01)
  *H04B 10/516* (2013.01)
  *H04L 27/00* (2006.01)
  *H04L 1/00* (2006.01)
  *H04L 1/20* (2006.01)

(52) U.S. Cl.
  CPC ....... *H04B 10/5161* (2013.01); *H04B 10/616* (2013.01); *H04B 10/6165* (2013.01); *H04L 1/0038* (2013.01); *H04L 1/206* (2013.01); *H04L 5/005* (2013.01); *H04L 27/0014* (2013.01); *H04L 2027/003* (2013.01)

(58) Field of Classification Search
  CPC ....... H04L 25/02; H04L 27/34; H04L 27/364; H04L 43/50; H04L 7/042; H04L 5/005; H04L 5/006
  USPC .......................................... 375/279; 370/338
  See application file for complete search history.

(56) References Cited

U.S. PATENT DOCUMENTS

| | | | |
|---|---|---|---|
| 2012/0057863 A1 | | 3/2012 | Winzer et al. |
| 2012/0155890 A1* | | 6/2012 | Zhou .................. H04B 10/6165 398/208 |
| 2013/0336649 A1 | | 12/2013 | Essiambre et al. |
| 2016/0323091 A1 | | 11/2016 | Inoue |

OTHER PUBLICATIONS

Michel, Stephanie, "Coherent optical receivers—the complete answer," Lightwave, Sep. 18, 2014, 5 pages.

Kim, Inwoong, et al. "Mitigation and Monitoring of the Impact of Extinction Ratio of IQ-Modulator on Nyquist M-QAM Signals," IEEE Photonics Technology Letters, vol. 26, No. 2, pp. 177-179, Jan. 15, 2014.

Mulugeta, Tadesse S. "Digital Signal Processing for Coherent Communication and Compensation of Photonic Integration Imperfections," Master dissertation, Erasmus Mundus MSc in Photonics, 66 pages, 2012.

Otto, Klaus-Holger. Letter to Law, David and members of the IEEE 802.3 Working Group regarding Start of 400ZR Interop Project, dated Nov. 7, 2016. Retrieved from URL: http://www.ieee802.org/3/minutes/nov16/incoming/OIF_to_IEEE_802d3_Nov_2016.pdf.

International Search Report and Written Opinion dated Jun. 25, 2018 in PCT Application No. PCT/US2018/021949.

Extended European Search Report dated Sep. 17, 2018 in European Patent Application No. 18163443.7.

Combined Search and Examination Report dated Sep. 17, 2018 in United Kingdom Patent Application No. 1804691.2.

Taiwanese Office Action dated Jan. 9, 2019 in Taiwanese Patent Application No. 107110410, and English translation thereof (25 pages).

Office Action for United Kingdom Patent Application No. 1804691.2 dated Aug. 28, 2019. 5 pages.

* cited by examiner

MITIGATING OPTICAL MODULATOR IMPAIRMENT FOR COHERENT OPTICAL COMMUNICATION SYSTEMS

BACKGROUND

Optical coherent communications allow information to be encoded in the phase and/or frequency in addition to amplitude of an optical signal. Such systems allow for complex modulation in which a single symbol can encode two or more bits of information. A transmitter can convert one or more electrical signals into one or more optical signals, and modulate the optical signal onto a carrier for transmission. At high frequencies, the drive voltage available for the modulator is constrained to reduce power dissipation. In addition, the modulator may have a limited extinction ratio, defined as the ratio of the modulator output power between the on and off states. The limited drive voltage and extinction ratio can distort the modulation constellation representing the various symbols encoded in the optical signal.

SUMMARY

At least one aspect is directed to a system for adjusting a reference constellation for demodulating an optical signal. The system includes a coherent electro-optical receiver configured to convert a received optical signal to a plurality of electrical signals, an array of analog-to-digital convertors configured to digitize the plurality of electrical signals, and processor logic. The processor logic is configured to process the digitized plurality of electrical signals using a reference constellation to yield a plurality of decoded signals and a signal quality measurement. The reference constellation includes an inphase component equal to an ideal inphase component plus an inphase offset. The inphase offset is initially set to zero. The reference constellation includes a quadrature component equal to an ideal quadrature component plus a quadrature offset. The quadrature offset is initially set to zero. The processor logic is configured to determine an optimal inphase offset by adjusting the inphase offset over a first range of values while monitoring the signal quality measurement and keeping the quadrature offset constant. The processor logic is configured to determine an optimal quadrature offset by adjusting the quadrature offset over a second range of values while monitoring the signal quality measurement and keeping the inphase offset constant. The processor logic is configured to update the reference constellation by setting the inphase offset to the determined optimal inphase offset and the quadrature offset to the determined optimal quadrature offset.

In some implementations, the processor logic is configured to monitor a subsample of the digitized plurality of electrical signals during operation and update the reference constellation by adjusting the inphase offset and the quadrature offset based on the monitoring. In some implementations, the processor logic is configured to send modulation constellation data to a transmitter of the optical signal for use in pre-distorting the optical signal.

In some implementations, the processor logic comprises high-speed processor logic and low-speed processor logic, the high-speed processor logic processes the digitized plurality of electrical signals, and the low-speed processor logic monitors a subsample of the digitized plurality of electrical signals during operation and updates the reference constellation by adjusting the inphase offset and the quadrature offset based on the monitoring. In some implementations, the low-speed processor logic sends modulation constellation data to a transmitter of the optical signal for use in pre-distorting the optical signal. In some implementations, the high-speed processing operates a frequencies above 1 gigabit per second, and the low-speed processing operates at frequencies below 10 megabits per second.

In some implementations, the signal quality measurement includes one of a signal-to-noise ratio of a recovered signal after carrier recovery or a pre-forward error correction bit error rate.

At least one aspect is directed to a method of adjusting a reference constellation for demodulating an optical signal. The method includes converting, using a coherent electro-optical receiver, a received optical signal to a plurality of electrical signals. The method includes digitizing, using an array of analog-to-digital convertors, the plurality of electrical signals. The method includes processing, using processor logic, the digitized plurality of electrical signals using a reference constellation to yield a plurality of decoded signals and a signal quality measurement. The reference constellation includes an inphase component equal to an ideal inphase component plus an inphase offset. The inphase offset is initially set to zero. The reference constellation includes a quadrature component equal to an ideal quadrature component plus a quadrature offset. The quadrature offset is initially set to zero. The method includes determining an optimal inphase offset by adjusting the inphase offset over a first range of values while monitoring the signal quality measurement and keeping the quadrature offset constant. The method includes determining an optimal quadrature offset by adjusting the quadrature offset over a second range of values while monitoring the signal quality measurement and keeping the inphase offset constant. The method includes updating the reference constellation by setting the inphase offset to the determined optimal inphase offset and the quadrature offset to the determined optimal quadrature offset.

In some implementations, the method includes monitoring, using the processor logic, a subsample of the digitized plurality of electrical signals during operation, and updating the reference constellation by adjusting the inphase offset and the quadrature offset based on the monitoring. In some implementations, the method includes sending, using the processor logic, modulation constellation data to a transmitter of the optical signal for use in pre-distorting the optical signal.

In some implementations, the processor logic comprises high-speed processor logic and low-speed processor logic, the high-speed processor logic processing the digitized plurality of electrical signals. In some implementations, the method includes monitoring, using the low-speed processor logic, a subsample of the digitized plurality of electrical signals during operation. In some implementations, the method includes updating, using the low-speed processor logic, the reference constellation by adjusting the inphase offset and the quadrature offset based on the monitoring. In some implementations, the method includes sending, using the low-speed processor logic, modulation constellation data to a transmitter of the optical signal for use in pre-distorting the optical signal. In some implementations, the high-speed processing operates a frequencies above 1 gigabit per second, and the low-speed processing operates at frequencies below 10 megabits per second.

In some implementations, the signal quality measurement includes one of a signal-to-noise ratio of a recovered signal after carrier recovery or a pre-forward error correction bit error rate.

In some implementations, determining the first optimal signal quality measurement and the second optimal signal quality measurement comprises adjusting the inphase offset and the quadrature offset, respectively, based on a blind search algorithm.

At least one aspect is directed to a system for adjusting a reference constellation for demodulating an optical signal. The system includes receiving means configured to convert a received optical signal to a plurality of electrical signals, converting means configured to digitize the plurality of electrical signals, and processing means. The processing means are configured to process the digitized plurality of electrical signals using a reference constellation to yield a plurality of decoded signals and a signal quality measurement. The reference constellation includes an inphase component equal to an ideal inphase component plus an inphase offset. The inphase offset is initially set to zero. The reference constellation includes a quadrature component equal to an ideal quadrature component plus a quadrature offset. The quadrature offset is initially set to zero. The processing means are configured to determine an optimal inphase offset by adjusting the inphase offset over a first range of values while monitoring the signal quality measurement and keeping the quadrature offset constant. The processing means are configured to determine an optimal quadrature offset by adjusting the quadrature offset over a second range of values while monitoring the signal quality measurement and keeping the inphase offset constant. The processing means are configured to update the reference constellation by setting the inphase offset to the determined optimal inphase offset and the quadrature offset to the determined optimal quadrature offset.

In some implementations, the processing means are configured to monitor a subsample of the digitized plurality of electrical signals during operation and update the reference constellation by adjusting the inphase offset and the quadrature offset based on the monitoring. In some implementations, the processing means are configured to send modulation constellation data to a transmitter of the optical signal for use in pre-distorting the optical signal.

In some implementations, the processing means comprises high-speed processor logic and low-speed processor logic, the high-speed processor logic processes the digitized plurality of electrical signals, and the low-speed processor logic monitors a subsample of the digitized plurality of electrical signals during operation and updates the reference constellation by adjusting the inphase offset and the quadrature offset based on the monitoring.

At least one aspect is directed to a method of adjusting a reference constellation for demodulating an optical signal. The method includes converting, using a coherent electro-optical receiver, a received optical signal to a plurality of electrical signals. The method includes digitizing, using an array of analog-to-digital convertors, the plurality of electrical signals. The method includes processing, using processor logic, the digitized plurality of electrical signals using a reference constellation to yield a plurality of decoded signals and a signal quality measurement. The reference constellation includes an optimal inphase component determined by a receiver-side blind search algorithm, which adjust the inphase offset and the relative amplitude of the inphase component over a set of pre-determined values while monitoring the signal quality measurement and keeping the quadrature offset and relative amplitude constant. The reference constellation includes an optimal quadrature component determined by a receiver side blind search algorithm; which adjust the inphase offset and the relative amplitude of the inphase component over a set of pre-determined values while monitoring the signal quality measurement and keeping the quadrature offset and relative amplitude constant.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

This disclosure relates generally to systems and methods for adjusting a reference constellation for demodulating an optical signal at a coherent optical receiver. Coherent optical communications convey complex modulated optical signals. Symbols present in a complex signal modulation technique can be represented in a Euclidian space with an inphase axis and an quadrature axis. Each symbol can be defined as a location (i.e., a finite, contiguous area) within the Euclidian space. The layout of all possible symbols is referred to as a constellation. Symbols are decoded by comparing the digitized signal to a reference constellation.

Coherent optical communications can provide several benefits including improved spectral efficiency and tolerance of optical impairments. Demanding cost, size, and power requirements, however, can limit the voltage drive swing available to generate the optical signals. In addition, many optical modulators employ a Mach-Zehnder modulator (MZM). MZMs have a limited extinction ratio (ER), which is defined as the modulator output power ratio between the on and off states. The low drive voltage to an MZM can make accurate demodulation sensitive to the MZM ER. A high ER requirement, however, can make using available lower-cost integrated optical modulators challenging if not impossible. This disclosure therefore proposes systems and methods for making adjustments to a reference constellation that will mitigate the deleterious effect of low ER on the bit error rate of the demodulated signal.

Typically, optimizing a reference constellation involves a high dimensional search problem; e.g., one or more dimensions for each possible symbol of the constellation. The systems and methods presented herein can reduce the high-dimensional search problem to a one-dimensional search problem, or a series of independent one-dimensional problems, using certain observations or assumptions about modulation constellation distortion. A search process can then be used to adjust a demodulation parameter to minimize or maximize a measured signal quality measurement of the demodulated signal. Dimension reduction is based on the assumption that a constellation distorted by limited MZM ER under reduced modulator driving swing exhibits a linear constellation shift. Thus, the search process can be used to find an optimal inphase offset for the reference constellation, followed by an optimal quadrature offset (or vice-versa). In this disclosure, "optimal" or "optimum" are used to describe a value of a parameter that results in a maximum, near maximum, or local maximum of a corresponding measured quantity. For example, systems according to this disclosure can adjust an inphase or a quadrature offset of a reference constellation to achieve a peak or near peak signal quality measurement. Adjustments can be made with a finite granularity such that only a certain number of possible offset values over the range of interest are tested. In some implementations, the optimal offset value can be chosen as the one that corresponds to the highest (or lowest) measured signal quality measurement. In some implementations, the system can extrapolate an optimal offset based on a theoretical peak signal quality measurement that would occur between two measured signal quality measurements. An example process can proceed as follows.

For a received signal, the reference constellation can initially be set to an ideal constellation; that is, zero offset in both the inphase and quadrature direction. The system can add an inphase offset to the reference constellation, and scan the inphase offset over a range of values (typically a range within +/− half the minimum distance between symbol centers in the inphase direction). The optimal inphase offset is the one that yields the best system performance as evidenced by a signal quality measurement such as signal-to-noise ratio or bit error rate. After the optimal inphase offset has been found, a quadrature offset can be added to the reference constellation. The system can scan a range of values of the quadrature offset and select an optimal quadrature offset in a similar manner. In some implementations, the system can determine the optimal quadrature and inphase offsets in the reverse order. A reference constellation including the optimal inphase offset and optimal quadrature offset can be used to demodulate signals during normal operation of the receiver.

In some implementations, the system can monitor the modulation constellation during normal operation (typically at the acquisition stage). In some implementations, the system can subsample an incoming signal and, using a simplified coherent digital signal-processing unit including adaptive equalization and carrier recovery, track modulation constellation changes. The system can update the reference constellation by adjusting the inphase offset and the quadrature offset to address changes in the received signal caused by fluctuations at the transmitter modulator or impairments of the optical link. In some implementations, modulation constellation data can be sent back to the transmitter. The transmitter can adjust the electrical driving signal and/or modulator bias settings to pre-distort the optical signal at the transmitter for easier demodulation at the receiver.

In some implementations, demodulation and reference constellation optimization can be performed in separate processor logic. For example, demodulation can be performed on high-speed processor logic to enable demodulation of optical signals in the range of tens of gigabits per second. Reference constellation optimization, however, need not be performed at such a high speed, and can therefore be performed on low-speed processor logic. The high-speed processor logic and the low-speed processor logic can both exist in the same digital signal processor (DSP) chip, or in separate DSPs.

Figure 1:
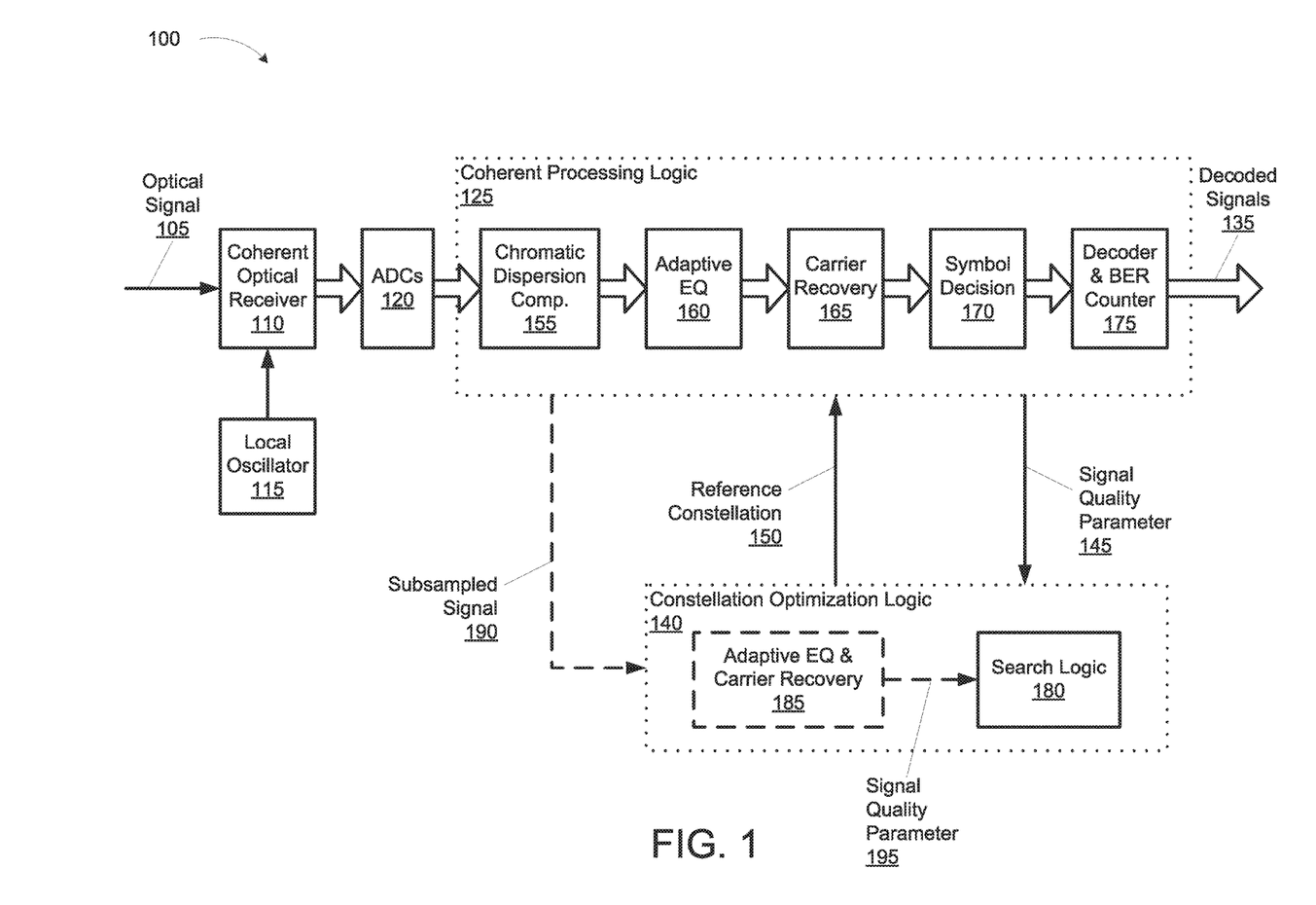
FIG. 1 is a block diagram of a system for adjusting a reference constellation for demodulating an optical signal, according to an illustrative implementation.

FIG. 1 is a block diagram of a system 100 for adjusting a reference constellation for demodulating an optical signal 105, according to an illustrative implementation. The system 100 receives an optical signal 105 and converts it to one or more decoded signals 135. The system 100 includes a coherent optical receiver 110, a local oscillator 115, analog-to-digital convertors (ADCs) 120, and coherent processing logic 125. The coherent processing logic 125 includes a chromatic dispersion compensation logic 155, adaptive equalization (EQ) logic 160, carrier recovery logic 165, symbol decision logic 170, and a decoder and bit-error-rate (BER) counter logic 175. The system 100 additionally includes constellation optimization logic 140 for adjusting a reference constellation for demodulating the optical signal 105. The constellation optimization logic 140 includes search logic 180. The constellation optimization logic 140 receives a signal quality measurement from the coherent processing logic 125, and returns a reference constellation 150 for use in decoding the optical signal 105. In some implementations, the system 100 can monitor a subsample of the incoming signal and adjust the reference constellation 150. In those implementations, the constellation optimization logic 140 can include adaptive EQ and carrier recovery 185 for receiving the subsampled signal 190 and providing a signal quality measurement 195 for use by the search logic 180.

The coherent optical receiver 110 receives the optical signal 105 and, with the aid of the local oscillator 115, converts the optical signal 105 into a plurality of electrical signals in the analog domain. The local oscillator 115 can include a continuous-wave, monochromatic light source, such as a laser diode. The frequency of the light produced by the local oscillator 115 can match the carrier frequency of the optical signal 105; however, in practice an exact match is difficult. Accordingly, the coherent processing logic 125 can employ carrier recovery logic 165 to compensate for frequency and phase differences between the optical signal 105 carrier wave and the light produced by the local oscillator 115. The coherent optical receiver 110 can include one or more light detectors, such as a photodiode, and an optical coupler for facilitating transmission of the optical signal 105 from an optical fiber carrying the optical signal 105 to the light detectors. The coherent optical receiver 110 can include one or more polarity beam splitters and one or more optical hybrids. The coherent optical receiver 110 can output the plurality of electrical signals containing inphase and quadrature components of the signal, which can represent amplitude and phase information carried by the optical signal 105. The ADCs 120 digitize the plurality of electrical signals into a digital signal suitable for processing by the coherent processing logic 125.

The coherent processing logic 125 can include a digital signal processor (DSP), application-specific integrated circuit (ASIC), or other processor capable of high-speed decoding of the digitized optical signal. The term "logic" as used herein can refer to digital components such as transistors in an integrated circuit, operations performed in software executing on an integrated circuit, or a combination of the two. The coherent processing logic 125 decodes the plurality of electrical signals into the decoded signals 135, which include all data streams that were modulated into the optical signal 105. The coherent processing logic 125 additionally yields a signal quality measurement 145. The signal quality measurement 145 provides a measure of the integrity of the data demodulated from the optical signal 105. In some implementations the signal quality measurement 145 can represent a signal-to-noise ratio (SNR) of a recovered signal after carrier recovery logic 165. In some implementations the signal quality measurement 145 can represent a pre-forward error correction bit error rate as calculated by the decoder and BER counter logic 175.

The coherent processing logic 125 includes chromatic dispersion compensation logic 155, adaptive equalization (EQ) logic 160, carrier recovery logic 165, symbol decision logic 170, and a decoder and bit-error-rate (BER) counter logic 175. The chromatic dispersion compensation logic 155 can include digital filters or other processes to equalize the chromatic dispersion experienced by the optical signal 105 as it travels over long lengths of optical fiber. The adaptive EQ logic 160 can include additional digital filters or other processes to correct for the effects of polarization-mode dispersion. The carrier recovery logic 165 can compensate for frequency and phase differences between the optical carrier wave and the local oscillator 115. The symbol decision logic 170 can interpret the interpret the symbols based on the reference constellation, which can be adjusted by the constellation optimization logic 140. The decoder and BER counter logic 175 can decode the symbols from the previous step into individual data streams representing each channel of the optical signal 105. The decoder and BER counter logic 175 can also determine a bit error rate (BER) of the optical signal 105 prior to forward error correction. The decoder and BER counter logic 175 may also include forward error correction. The coherent processing logic 125 outputs a signal quality measurement 145 to the constellation optimization logic 140. The coherent processing logic 125 can receive a reference constellation 150 determined by the constellation optimization logic 140.

The constellation optimization logic 140 can include a (DSP), application-specific integrated circuit (ASIC), or other processor capable of performing search processes on reference constellations. The constellation optimization logic 140 can implement search logic 180 for determining an optimal reference constellation 150 for use by the coherent processing logic 125 in demodulating the optical signal 105. Observing that modulation constellations can distort in a linear fashion with respect to inphase and quadrature symbol position, as described in further detail below with respect to FIGS. 3A, 3B, 4A, and 4B, the search logic 180 can be employed to introduce an inphase offset and a quadrature offset to the reference constellation with respect to the ideal constellation. In some implementations, the search logic 180 can include a blind search algorithm. The search logic 180 can scan over a range of values of inphase offset while monitoring the signal quality measurement 145. The range of values of inphase offset can typically include a range within +/− half the minimum distance between symbol centers in the inphase direction. The search logic 180 can determine an optimal inphase offset based on the inphase offset that achieves a high or highest signal quality measurement 145. In some implementations the signal quality measurement 145 can include one of a signal-to-noise ratio of a recovered signal after carrier recovery or a BER before forward error correction. After the optimal inphase offset has been found, it can be added to the reference constellation 150, and the search logic 180 can repeat the process for a quadrature offset. The resulting reference constellation 150 can be used by the coherent processing logic 125 to demodulate the optical signal 105.

In some implementations, the system 100 can monitor a subsample of the incoming signal and adjust the reference constellation 150. In those implementations, the constellation optimization logic 140 can receive the subsampled signal 190 from the coherent processing logic 125, and apply a second adaptive EQ and carrier recovery 185, which can provide a second signal quality measurement 195 for use by the search logic 180. This continuous processing can enable the system 100 to adapt to fluctuations in the modulator at the transmitter of the optical signal 105 and to impairments of the optical fiber link conveying it. In some implementation, the monitoring can be occasional, periodic, or continuous. For occasional monitoring, the system 100 can trigger monitoring a subsample of the input signal based on an internal or external event, such as a change in BER, SNR, or in response to a user or external system instruction. An example method of operation of the system 100 to adjust a reference constellation for demodulating the optical signal is described below with respect to FIG. 5.

In some implementations, the constellation optimization logic 140 can exist on the same physical processor as the coherent processing logic 125. In some implementations, the constellation optimization logic 140 can exist in a separate physical processor from the coherent processing logic 125. In some implementations, the constellation optimization logic 140 can include relatively low-speed processing relative to the high-speed processing of the coherent processing logic 125. For example, the coherent processing logic 125 can operate at a high enough speed to process the optical signal 105. The coherent processing logic 125 can thus operate at frequencies above 1 gigabit per second up to tens of gigabits per second. The constellation optimization logic 140 is not constrained by the frequency of the optical signal 105. Thus in some implementations the constellation optimization logic 140 can operate at frequencies below 10 megabits per second down to several kilobits per second.

Figure 2:
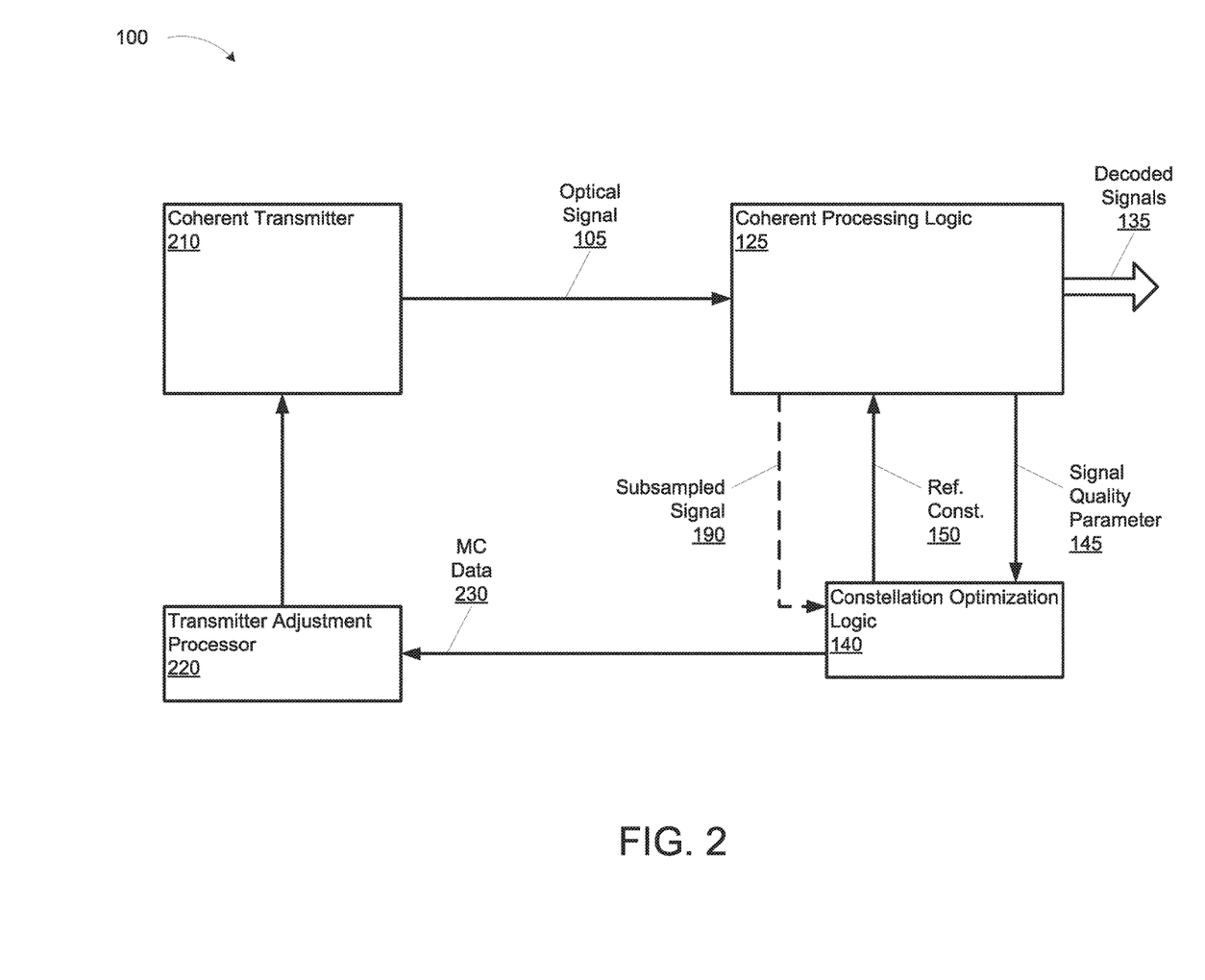
FIG. 2 is a block diagram of a system for adjusting a reference constellation for demodulating an optical signal and sending modulation constellation data to a transmitter of the optical signal, according to an illustrative implementation.
Figure 3A:
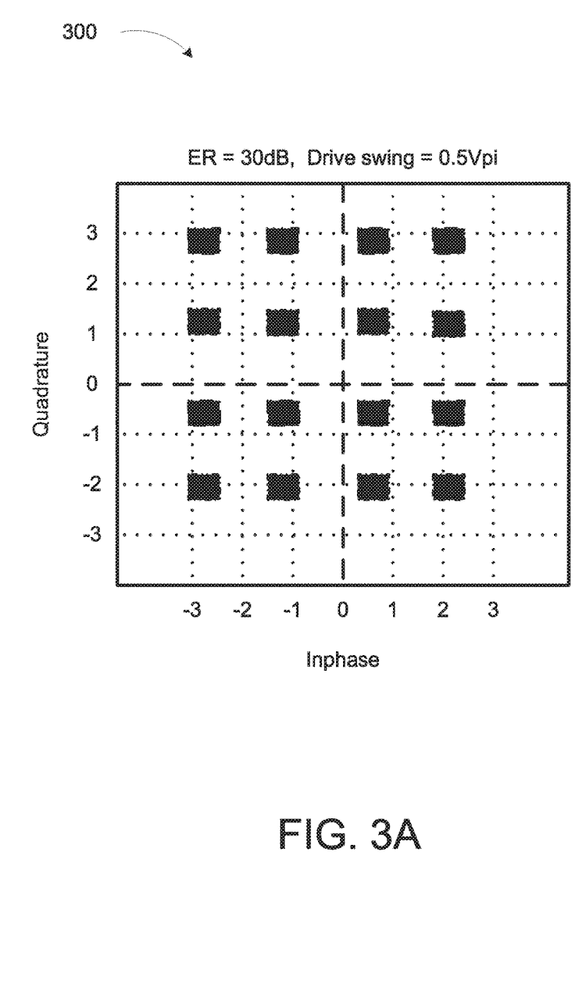
FIGS. 3A and 3B are graphs representing modulation constellations corresponding to different drive swing voltages, according to an illustrative implementation.
Figure 3B:
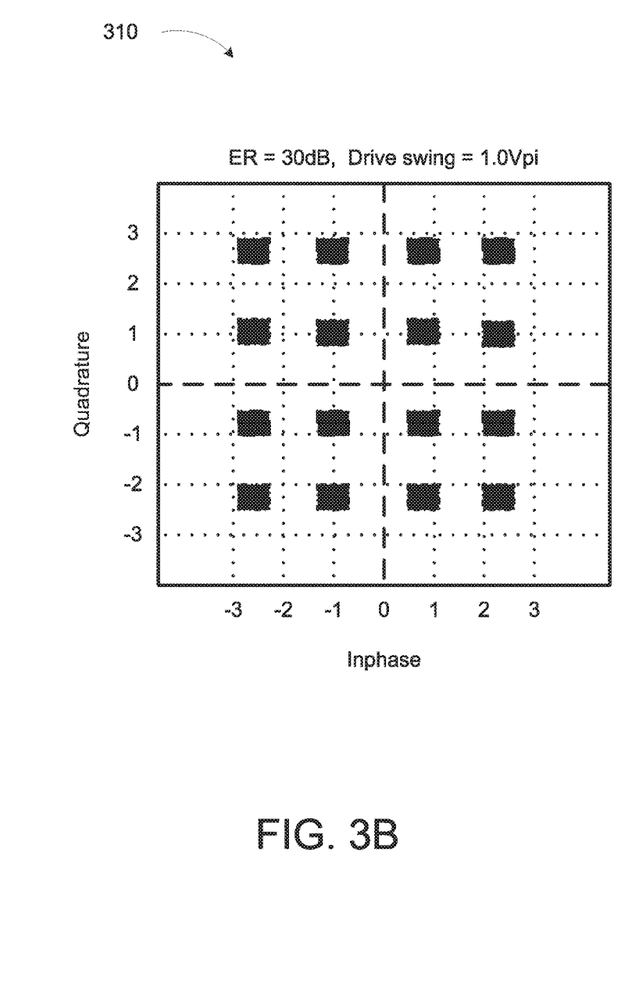

FIG. 2 is a block diagram of a system 200 for adjusting a reference constellation for demodulating an optical signal and sending modulation constellation data to a transmitter of the optical signal, according to an illustrative implementation. The system 200 includes the coherent processing logic 125 and constellation optimization logic 140 previously described with respect to FIG. 1. The system 200 additionally shows a coherent transmitter 210, which generates and transmits the optical signal 105. The coherent processing logic 125 and constellation optimization logic 140 can operate as in system 100, while additionally sending modulation constellation (MC) data 230 to a transmitter adjustment processor 220 associated with the coherent transmitter 210. The modulation constellation data 230 can be sent via an in-band or an out-of-band communication channel. The transmitter adjustment processor 220 in turn sends one or more transmitter adjustment parameters 235 to the coherent transmitter 210. The transmitter adjustment parameters 235 adjust one or more parameters of the coherent transmitter 210. In some implementations, the transmitter adjustment parameters 235 can adjust the amplitude and phase of some or all of the electrical signals controlling the modulator of the coherent transmitter 210. In some implementations, the transmitter adjustment parameters 235 can adjust the bias settings of the modulator itself.

The transmitter adjustment processor 220 can include a microprocessor or a specialized processing device such as an application-specific integrated circuit (ASIC) for field-programmable gate array (FPGA). The transmitter adjustment processor 220 can include logic or code for generating the transmitter adjustment parameter 235 based on the modulation constellation data 230 received from the constellation optimization logic 140. The modulation constellation data can include the inphase and quadrature offset data. In some implementations, the modulation constellation data may also include the full inphase and quadrature constellation data, although it is not necessary. The transmitter pre-distortion logic then use the received inphase and quadrature constellation offset data to calculate the required amount of DC offset adjustments for the electrical driving signals by using the pre-calibrated electrical-optical response function of the modulator, and then apply the calculated DC offset adjustments to the corresponding inphase and quadrature electrical driving signals to pre-compensate for the modulation constellation distortion. An example method of operation of the system 200 to adjust a reference constellation for demodulating the optical signal is described below with respect to FIG. 5.

FIGS. 3A, 3B, 4A and 4B are graphs representing simulated 16-channel quadrature amplitude modulation signal (16QAM) modulation constellations 300, 310, 400, and 410. Although 16QAM modulation constellations are shown for simplicity, this disclosure applies equally to 32QAM, 64QAM, and other modulating schemes. The modulation constellations 300, 310, 400, and 410 are generated by a Mach-Zehnder Modulator (MZM) based inphase-quadrature modulator under different driving conditions: MZM extinction ratio (ER) of 30 or 20 dB, and driving swing of 0.5 peak input volts (Vpi) or 1.0 Vpi. The modulation constellations 300 and 310 illustrate simulated results of an MZM having an ER of 30 dB. The modulation constellation 310 has a higher drive swing than the modulation constellation 300; i.e., 1.0 Vpi versus 0.5 Vpi. The modulation constellation 300 exhibits distortion whereby the modulation constellation becomes asymmetric with a shift in the positive quadrature and negative inphase direction with respect to the modulation constellation 310.

Figure 4A:
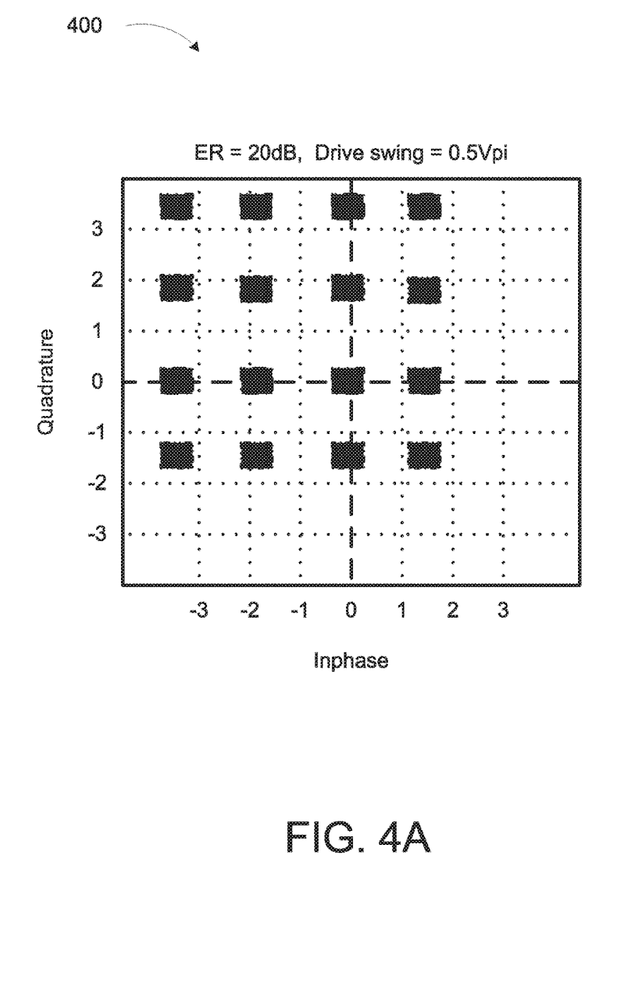
FIGS. 4A and 4B are graphs representing modulation constellations corresponding to different drive swing voltages, according to an illustrative implementation.
Figure 4B:
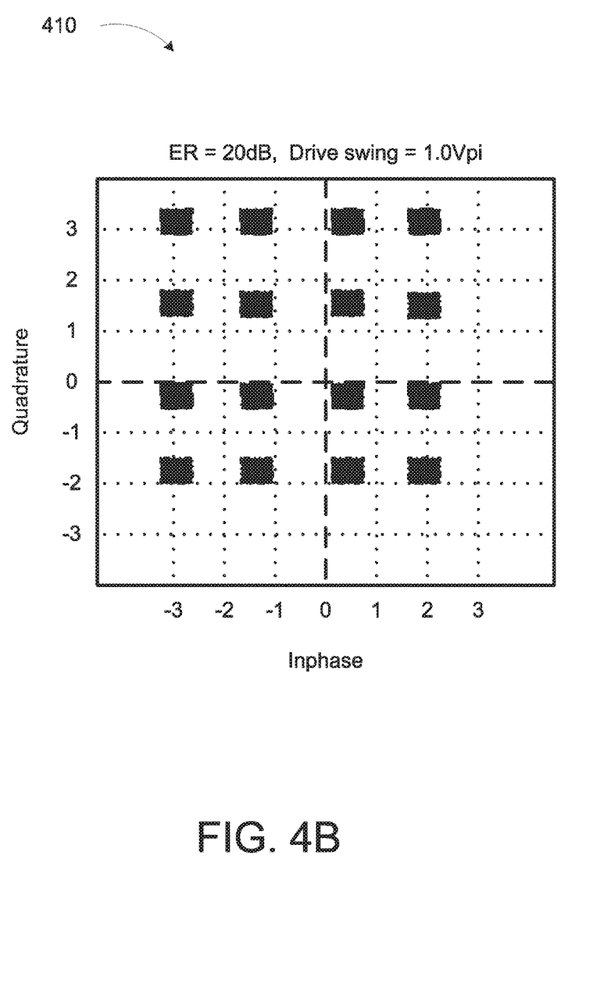

Similarly, the modulation constellations 400 and 410 illustrate simulated results of an MZM having a lower ER of 20 dB. The modulation constellation 410 has a higher drive swing than the modulation constellation 400; i.e., 1.0 Vpi versus 0.5 Vpi. The modulation constellation 410 exhibits a large asymmetry even at the higher drive swing of 1.0 Vpi.

Optical coherent communication requires the use of a reference constellation at the receiver in order to demodulate the transmitter signal. An ideal signal constellation is often used as the reference constellation. The modulation constellation 400 exhibits such a profound shift, however, that most if not all symbols would be ambiguous (e.g., falling equidistant from two or more possible symbol locations) with respect to the ideal (symmetrical) signal constellation. The signal would therefore be difficult and highly error prone to decode using the ideal modulation constellation.

It is noted, however, that the distortion of the modulation constellation results in a linear shift with respect to inphase and quadrature symbol positions. Accordingly, a search process can be employed to introduce and adjust an inphase offset and a quadrature offset to the reference constellation with respect to the ideal constellation. The inphase offset and the quadrature offset can be adjusted based on feedback of a signal quality measurement yielded by the signal demodulation/decoding process. Example implementations of methods of adjusting a reference constellation for demodulating the optical signal is described below with respect to FIG. 5. These and other methods of adjusting a reference constellation for demodulating the optical signal can be performed using the example implementations of systems 100 and 200 described previously with respect to FIGS. 1 and 2. The systems and methods can employ different modulation schemes with more or fewer channels without departing from the scope of this disclosure.

Figure 5:
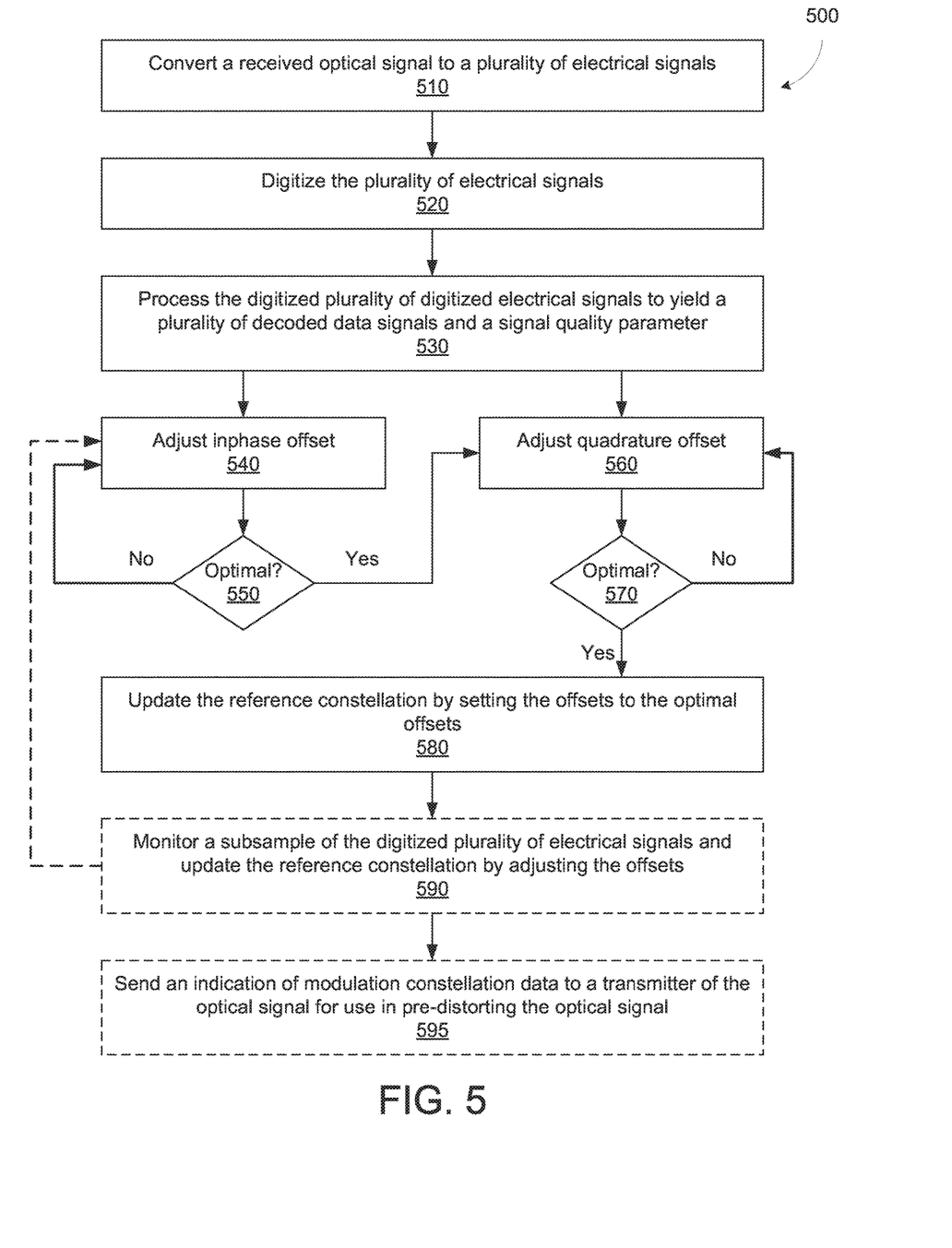
FIG. 5 is flowchart of an example method of adjusting a reference constellation for demodulating an optical signal, according to an illustrative implementation.

FIG. 5 is flowchart of an example method 500 of adjusting a reference constellation for demodulating an optical signal, according to an illustrative implementation. The method 500 includes converting a received optical signal to a plurality of electrical signals (stage 510). The method 500 includes digitizing the plurality of electrical signals (stage 520). The method 500 includes processing the digitized electrical signals to yield a plurality of decoded data signals and a signal quality measurement (stage 530). The method 500 includes adjusting the inphase offset while monitoring the signal quality measurement and keeping the quadrature offset constant (stage 540). The method 500 includes determining whether the inphase offset is optimal (decision block 550). If the method 500 determines that the inphase offset is not optimal, the method 500 returns to stage 540 and continues adjusting the inphase offset until an optimal value is determined. If the method 500 determines that the inphase offset is optimal, the method 500 continues to stage 560. The method 500 includes adjusting the quadrature offset w while monitoring the signal quality measurement and keeping the inphase offset constant (stage 560). The method 500 includes determining whether the quadrature offset is optimal (decision block 570). If the method 500 determines that the quadrature offset is not optimal, the method 500 returns to stage 560 and continues adjusting the quadrature offset until an optimal value is determined. If the method 500 determines that the quadrature offset is optimal, the method 500 continues to stage 580. In some implementations, the method 500 can perform adjustment of the inphase offset and the quadrature offset in reverse; that is, performing stages 560 and 570 before stages 540 and 550. The method 500 includes updating the reference constellation by setting the inphase offset to the determined optimal inphase offset and the quadrature offset to the determined optimal quadrature offset (stage 580). In some implementations, the method 500 can optionally include monitoring a subsample of the digitized plurality of electrical signals and updating the reference constellation by adjusting the inphase offset and the quadrature offset based on the monitoring (stage 590). In some implementations, the method 500 can optionally include sending modulation constellation data to a transmitter of the optical signal for use in pre-distorting the optical signal (stage 595).

The method 500 includes converting a received optical signal to a plurality of electrical signals (stage 510). A coherent optical signal demodulating system, such as system 100 or 200, can have light receiver such as the coherent optical receiver 110 for converting a received optical signal, such as optical signal 105 to one or more electrical signals. The coherent optical receiver 110 can include one or more light detectors, such as a photodiode, and an optical coupler for facilitating transmission of the optical signal 105 from an optical fiber carrying the optical signal 105 to the light detectors. The light detectors can convert the optical signal into one or more electrical signals in the analog domain.

The method 500 includes digitizing the plurality of electrical signals (stage 520). The system can include one or more analog-to-digital convertors (ADCs), such as ADCs 120. The ADCs 120 can digitize the plurality of electrical signals into a digital signal suitable for processing by coherent processing logic such as the coherent processing logic 125.

The method 500 includes processing the digitized electrical signals to yield a plurality of decoded data signals and a signal quality measurement (stage 530). The coherent processing logic 125 can employ successive processing such as chromatic dispersion compensation logic 155, adaptive equalization (EQ) logic 160, carrier recovery logic 165, symbol decision logic 170, and decoding and bit-error-rate (BER) counting logic 175 to yield the plurality of decoded data signals 135 and the signal quality measurement 145. Optimization logic, such as the constellation optimization logic 140, can monitor the signal quality measurement 145 while adjusting the inphase offset and the quadrature offset in turn to determine an optimal reference constellation 150.

The method 500 includes adjusting the inphase offset while monitoring the signal quality measurement and keeping the quadrature offset constant (stage 540). The constellation optimization logic 140 can employ a search process using the search logic 180 to adjust the inphase offset over a range of values. The search logic 180 can monitor the value of the signal quality measurement 145 for the different values of the inphase offset. The range of values can include +/− half the minimum distance between symbol centers in the inphase direction of the modulation constellation graph. The method 500 need not scan this range of values, however. In some implementations, the method 500 can scan enough values to discern a peak in the signal quality measurement 145 response.

The method 500 includes determining whether the inphase offset is optimal (decision block 550). The search logic 180 can determine whether the value of the signal quality measurement 145 is, or is close to, a peak value that indicates an optimal value for the inphase offset. In some implementations, the search logic 180 can chose the optimal offset value as the one that corresponds to the highest (or lowest) measured signal quality measurement. In some implementations, the search logic 180 can extrapolate an optimal offset based on a theoretical peak signal quality measurement occurring between measured signal quality measurements. If the method 500 determines that the inphase offset is not optimal, the method 500 returns to stage 540 and continues adjusting the inphase offset until an optimal value is determined. If the method 500 determines that the inphase offset is optimal, the method 500 continues to stage 560.

The method 500 includes adjusting the quadrature offset while monitoring the signal quality measurement and keeping the inphase offset constant (stage 560). The method 500 includes determining whether the quadrature offset is optimal (decision block 570). Stage 560 and decision block 570 can be performed in a manner similar to stage 540 and decision block 550, respectively, described above, replacing inphase offset with quadrature offset. If the method 500 determines that the quadrature offset is not optimal, the method 500 returns to stage 560 and continues adjusting the quadrature offset until an optimal value is determined. If the method 500 determines that the quadrature offset is optimal, the method 500 continues to stage 580. In some implementations, the method 500 can perform adjustment of the inphase offset and the quadrature offset in reverse; that is, performing stages 560 and 570 before stages 540 and 550.

The method 500 includes updating the reference constellation by setting the inphase offset to the determined optimal inphase offset and the quadrature offset to the determined optimal quadrature offset (stage 580). The reference constellation 150 can include the ideal constellation plus the inphase offset and quadrature offset determined in stages 540-570. The constellation optimization logic 140 can send the reference constellation 150 to the coherent processing logic 125 for use in demodulation the optical signal 105 during normal operation.

In some implementations, the method 500 can optionally include monitoring a subsample of the digitized plurality of electrical signals and updating the reference constellation by adjusting the inphase offset and the quadrature offset based on the monitoring (stage 590). In some implementations, the constellation optimization logic 140 can include a second adaptive EQ and carrier recovery 185. The adaptive EQ and carrier recovery 185 can receive a subsampled signal 190 from the coherent processing logic 125, and use it to track the modulation constellation and adapt the reference constellation 150 to any changes or impairments in operation of the transmitter modulator or the optical fiber link conveying the optical signal 105. In some implementations, the constellation optimization logic 140 can operate at a lower speed than the coherent processing logic 125.

In some implementations, the method 500 can optionally include sending modulation constellation data to a transmitter of the optical signal for use in pre-distorting the optical signal (stage 595). In some implementations, the constellation optimization logic 140 can send modulation constellation data 230 to a transmitter adjustment processor 220. The modulation constellation data 230 can be conveyed by either in-band or out-of-band communication. The transmitter adjustment processor 220 can provide the coherent transmitter 210 with a transmitter adjustment parameter 235. In some implementations, the transmitter adjustment parameters 235 can include adjustments to one or more of the electrical signals controlling the modulator of the coherent transmitter 210 or the bias settings of the modulator itself. The coherent transmitter 210 can use the transmitter adjustment parameters 235 to pre-distort the optical signal 105 to maintain a desired modulation constellation downstream at the coherent processing logic 125.

The method 500 can include more or fewer stages without departing from the scope of this disclosure.

As exemplary examples, in accordance with the spirit of the present invention, some other deterministic modulator impairments such as the impairments caused by the nonlinearity of the modulator (with known electrical-optical transfer function) as well as the impairments caused by non-equal inphase and quadrature amplitude may be mitigated by using the proposed blind search based reference constellation adjustment method. For these two exemplary cases, in addition to blindly search and adjust the inphase and quadrature offsets to mitigate modulator ER caused impairments, we can also blindly search and adjust the relative amplitude between the inphase and the quadrature components of the reference constellation to mitigate the impairments caused by the use of amplitude-unbalanced inphase and quadrature modulator. For the case that the modulator nonlinearity is significant (for example when the drive voltage swing is greater than Vpi), we can blindly search (using the known modulator electrical-optical nonlinear response function) and then adjust the relative amplitude between the constellation points for both the inphase and quadrature components to mitigate impairments caused by modulator nonlinearity.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A system for adjusting a reference constellation for demodulating an optical signal comprising:
    a coherent electro-optical receiver configured to convert a received optical signal to a plurality of electrical signals;
    an array of analog-to-digital convertors configured to digitize the plurality of electrical signals; and
    processor logic configured to:
        process the digitized plurality of electrical signals using a reference constellation to yield a plurality of decoded signals and a signal quality measurement, the reference constellation including:
            an inphase component equal to an ideal inphase component plus an inphase offset, the inphase offset initially set to zero, and
            a quadrature component equal to an ideal quadrature component plus a quadrature offset, the quadrature offset initially set to zero;
        determine an optimal inphase offset for the entire reference constellation by adjusting the inphase offset over a first range of values while monitoring the signal quality measurement and keeping the quadrature offset of the reference constellation constant;
        determine an optimal quadrature offset for the entire reference constellation by adjusting the quadrature offset over a second range of values while monitoring the signal quality measurement and keeping the inphase offset of the reference constellation constant; and update the reference constellation by setting the inphase offset for the entire reference constellation to the determined optimal inphase offset and the quadrature offset for the entire reference constellation to the determined optimal quadrature offset.

2. The system of claim 1, wherein the processor logic is configured to monitor a subsample of the digitized plurality of electrical signals during operation and update the reference constellation by adjusting the inphase offset and the quadrature offset based on the monitoring.

3. The system of claim 2, wherein the processor logic is configured to send modulation constellation data to a transmitter of the optical signal for use in pre-distorting the optical signal.

4. The system of claim 1, wherein:
the processor logic comprises high-speed processor logic and low-speed processor logic;
the high-speed processor logic processes the digitized plurality of electrical signals; and
the low-speed processor logic monitors a subsample of the digitized plurality of electrical signals during operation and updates the reference constellation by adjusting the inphase offset and the quadrature offset based on the monitoring.

5. The system of claim 4, wherein the low-speed processor logic sends modulation constellation data to a transmitter of the optical signal for use in pre-distorting the optical signal.

6. The system of claim 4, wherein the high-speed processing operates a frequencies above 1 gigabit per second, and the low-speed processing operates at frequencies below 10 megabits per second.

7. The system of claim 1, wherein the signal quality measurement includes one of a signal-to-noise ratio of a recovered signal after carrier recovery or a pre-forward error correction bit error rate.

8. The system of claim 1, wherein the processor logic is configured to determine the optimal inphase offset and the optimal quadrature offset, respectively, using a blind search algorithm.

9. A method of adjusting a reference constellation for demodulating an optical signal comprising:
converting, using a coherent electro-optical receiver, a received optical signal to a plurality of electrical signals;
digitizing, using an array of analog-to-digital convertors, the plurality of electrical signals;
processing, using processor logic, the digitized plurality of electrical signals using a reference constellation to yield a plurality of decoded signals and a signal quality measurement, the reference constellation including:
an inphase component equal to an ideal inphase component plus an inphase offset, the inphase offset initially set to zero, and
a quadrature component equal to an ideal quadrature component plus a quadrature offset, the quadrature offset initially set to zero;
determining an optimal inphase offset for the entire reference constellation by adjusting the inphase offset over a first range of values while monitoring the signal quality measurement and keeping the quadrature offset of the reference constellation constant;
determining an optimal quadrature offset for the entire reference constellation by adjusting the quadrature offset over a second range of values while monitoring the signal quality measurement and keeping the inphase offset of the reference constellation constant; and
updating the reference constellation by setting the inphase offset for the entire reference constellation to the determined optimal inphase offset and the quadrature offset for the entire reference constellation to the determined optimal quadrature offset.

10. The method of claim 9, comprising:
monitoring, using the processor logic, a subsample of the digitized plurality of electrical signals during operation; and
updating the reference constellation by adjusting the inphase offset and the quadrature offset based on the monitoring.

11. The method of claim 10, comprising:
sending, using the processor logic, modulation constellation data to a transmitter of the optical signal for use in pre-distorting the optical signal.

12. The method of claim 9, wherein the processor logic comprises high-speed processor logic and low-speed processor logic, the high-speed processor logic processing the digitized plurality of electrical signals, the method comprising:
monitoring, using the low-speed processor logic, a subsample of the digitized plurality of electrical signals during operation; and
updating, using the low-speed processor logic, the reference constellation by adjusting the inphase offset and the quadrature offset based on the monitoring.

13. The method of claim 12, comprising:
sending, using the low-speed processor logic, modulation constellation data to a transmitter of the optical signal for use in pre-distorting the optical signal.

14. The method of claim 12, wherein the high-speed processing operates a frequencies above 1 gigabit per second, and the low-speed processing operates at frequencies below 10 megabits per second.

15. The method of claim 9, wherein the signal quality measurement includes one of a signal-to-noise ratio of a recovered signal after carrier recovery or a pre-forward error correction bit error rate.

16. The method of claim 9, wherein determining the first optimal signal quality measurement and the second optimal signal quality measurement comprises adjusting the inphase offset and the quadrature offset, respectively, based on a blind search algorithm.

17. A system for adjusting a reference constellation for demodulating an optical signal comprising:
receiving means configured to convert a received optical signal to a plurality of electrical signals;
converting means configured to digitize the plurality of electrical signals; and
processing means configured to:
process the digitized plurality of electrical signals using a reference constellation to yield a plurality of decoded signals and a signal quality measurement, the reference constellation including:
an inphase component equal to an ideal inphase component plus an inphase offset, the inphase offset initially set to zero, and
a quadrature component equal to an ideal quadrature component plus a quadrature offset, the quadrature offset initially set to zero;
determine an optimal inphase offset for the entire reference constellation by adjusting the inphase offset over a first range of values while monitoring the signal quality measurement and keeping the quadrature offset of the reference constellation constant;

determine an optimal quadrature offset for the entire reference constellation by adjusting the quadrature offset over a second range of values while monitoring the signal quality measurement and keeping the inphase offset of the reference constellation constant; and update the reference constellation by setting the inphase offset for the entire reference constellation to the determined optimal inphase offset and the quadrature offset for the entire reference constellation to the determined optimal quadrature offset.

18. The system of claim 17, wherein the processing means are configured to monitor a subsample of the digitized plurality of electrical signals during operation and update the reference constellation by adjusting the inphase offset and the quadrature offset based on the monitoring.

19. The system of claim 18, wherein the processing means are configured to send modulation constellation data to a transmitter of the optical signal for use in pre-distorting the optical signal.

20. The system of claim 17, wherein:
the processing means comprises high-speed processor logic and low-speed processor logic;
the high-speed processor logic processes the digitized plurality of electrical signals; and
the low-speed processor logic monitors a subsample of the digitized plurality of electrical signals during operation and updates the reference constellation by adjusting the inphase offset and the quadrature offset based on the monitoring.

21. A method of adjusting a reference constellation for demodulating an optical signal comprising:
converting, using a coherent electro-optical receiver, a received optical signal to a plurality of electrical signals;
digitizing, using an array of analog-to-digital convertors, the plurality of electrical signals; and
processing, using processor logic, the digitized plurality of electrical signals using a reference constellation to yield a plurality of decoded signals and a signal quality measurement, the reference constellation including:
an optimal inphase component determined by a receiver-side blind search algorithm, which adjusts the inphase offset for the entire reference constellation and the relative amplitude of the inphase component over a set of pre-determined values while monitoring the signal quality measurement and keeping the quadrature offset of the reference constellation and relative amplitude constant; and
an optimal quadrature component determined by a receiver side blind search algorithm; which adjust the inphase offset for the entire reference constellation and the relative amplitude of the inphase component over a set of pre-determined values while monitoring the signal quality measurement and keeping the quadrature offset of the reference constellation and relative amplitude constant.

* * * * *